April 17, 1945.　　　C. T. WALTER　　　2,373,865
SAUSAGE STUFFING MACHINE
Filed Aug. 27, 1940　　　6 Sheets-Sheet 1

Fig.1

Charles T. Walter
INVENTOR
BY
ATTORNEY

April 17, 1945.　　　C. T. WALTER　　　2,373,865
SAUSAGE STUFFING MACHINE
Filed Aug. 27, 1940　　　6 Sheets-Sheet 2

Fig. 2

Charles T. Walter
INVENTOR

ATTEST-

BY

ATTORNEY

April 17, 1945.  C. T. WALTER  2,373,865
SAUSAGE STUFFING MACHINE
Filed Aug. 27, 1940  6 Sheets-Sheet 3

Charles T. Walter
INVENTOR

BY R. H. Story
ATTORNEY

April 17, 1945.　　　C. T. WALTER　　　2,373,865
SAUSAGE STUFFING MACHINE
Filed Aug. 27, 1940　　　6 Sheets-Sheet 5

Fig. 5

Charles T. Walter
INVENTOR

ATTEST-

BY

ATTORNEY

April 17, 1945.  C. T. WALTER  2,373,865
SAUSAGE STUFFING MACHINE
Filed Aug. 27, 1940  6 Sheets-Sheet 6

Charles T. Walter
INVENTOR

BY R. G. Story
ATTORNEY

Patented Apr. 17, 1945

2,373,865

UNITED STATES PATENT OFFICE 2,373,865

SAUSAGE STUFFING MACHINE

Charles T. Walter, Chicago, Ill., assignor to Industrial Patents Corporation, Chicago, Ill., a corporation of Delaware Application August 27, 1940, Serial No. 354,384

16 Claims. (Cl. 17—35)

This invention relates to a sausage stuffing machine or like device.

An object of the present invention is to provide an improved sausage stuffing device for continuous operation.

Another object of the present invention is to provide a method by which sausage meat and like material may be stuffed into casings, cans, or other containers continuously and without the necessity of periodically shutting down the sausage stuffer in order to load it with product to be stuffed.

Another object of the present invention is to provide a device by means of which viscous material may be extruded continuously at a uniform pressure and without the necessity of stopping operations in order to fill the device with material.

Another object of the invention is to provide a device for the continuous expressing of granular or viscous material under a large and uniform pressure.

Another object of the invention is to provide an improved gear type pressure pump for subjecting granular or viscous material to considerable pressure.

A still further object of the invention is to provide a gear pump with closely fitting, coarse, gear teeth and means whereby non-compressible material can be efficiently removed from the intermeshing gear teeth.

Other objects of the invention will be apparent from the description and claims which follow.

One of the crying needs of the meat packing industry for many years has been a sausage stuffing machine suitable for the continuous stuffing of sausage and like products. The present type of stuffer comprises a large cylinder placed upright upon the floor and with the stuffing nozzles extending from the side adjacent the top edge, at a height slightly above the stuffing table; a top firmly held on the cylinder by a number of heavy bolts; and a heavy, tight-fitting piston working in the cylinder upwardly from the bottom. In filling such a stuffer, the piston is retracted to the bottom of the cylinder, and the top is unbolted and removed, usually by pivoting out of the way. The operator shovels comminuted meat from a meat truck into the top of the empty cylider until it is full. The head is replaced and tightly bolted, and the operator can then begin the stuffing operation. After the charge placed in the cylinder has been removed through the stuffing operation, the loading process must be repeated.

In the use of the sausage stuffers heretofore known, the operator may spend as much as half of his working time in loading the comminuted meat into the sausage stuffer, the portion so spent depending upon the size and style of the stuffer and the size of the individual pieces of sausage being stuffed. The working pressure of the average sausage stuffer is approximately eighty pounds per square inch so that the removable cover of the known stuffers must be made of heavy material and attached by heavy fastening means. It therefore takes considerable time and strength to remove the cover from the ordinary sausage stuffer, load the stuffer with comminuted meat and replace the cover ready to start the stuffing operation. The tendency is, therefore, to use stuffers as large as possible in order to lessen the portion of time spent in loading the stuffers. Necessarily, the larger the stuffer the larger and heavier must be the various parts. This results in machines with parts so heavy that cleaning is a very important problem. For example, in the ordinary large stuffer the piston in the cylinder is so heavy and fits so tightly that it can be removed and replaced only with the labor of several men and use of powerful hoists.

Several attempts have been made to provide a continuous sausage stuffing machine. Heretofore all such machines have been unsatisfactory. The majority of such machines have used the feed screw type of device in which the feed screw builds up the necessary pressure. This is impractical because the pressures so secured are not sufficiently large to be satisfactory in the sausage stuffing operation. Efficient operation of a sausage stuffing machine requires pressures of approximately eighty pounds per square inch. Long before such pressures are secured by means of this type of device, the pressure pushes the material, no matter how viscous it may be, backwards around the screw. Also, the screw must fit tightly in its cylinder, which tends to crush and press the sausage material, which, it is believed, has a deleterious effect upon the quality of the sausage. The use of this type of a continuous sausage stuffer, therefore, is unsatisfactory and disadvantageous because, primarily, sufficient operating pressure cannot be secured, and also because of the detrimental effects it has upon the resulting product.

A gear pressure pump has also been suggested, but this has proven unsatisfactory because so much force was required to operate such a pump, and also because it did not permit close regulation of the pressure on the comminuted meat, which is very necessary in order to avoid breaking the casings. It is very desirable to maintain pressures as high as possible in order to stuff satisfactorily and still not break the casings, which are rather delicate. For this reason, fluctuating pressures are very unsatisfactory.

The present invention overcomes the defects of prior devices, and provides a continuous sausage stuffing device which can intermittently be loaded with sausage or like material without in any way interfering with the stuffing operation. It permits the operator, known as the "stuffer," to work steadily on stuffing the sausage into the container. Incidentally, the present invention is quite simple and is little more expensive than the ordinary good stuffing machine. A further advantage of the present invention is that the parts are light so that the machine can easily be taken apart for cleaning.

Briefly, the sausage stuffer of the present invention provides a means for constantly exerting a relatively low pressure upon the comminuted meat, a means for increasing the pressure thereon to one slightly above a predetermined operating pressure, and means for maintaining the product under a substantially constant operating pressure. The three principal elements of such a device are (1) a feed screw operating within a hopper to exert a relatively small pressure upon the comminuted meat in order to force it into (2) a gear pressure pump, which builds the pressure up to a point slightly above the desired operating pressure, and (3) a pressure equalization chamber equipped with a piston upon which is exerted a constant pressure from an outside source, and thereby permits the discharge of the sausage material at a constant operating pressure. These three elements are necessary in order to permit the stuffing operation to take place at a constantly uniform desired operating pressure.

The preferred embodiment of the present invention comprises a hopper, one surface of which terminates in a truncated cone. Operating within the hopper and cone is a large, long-pitch screw which forceably feeds the product toward the apex of the cone. The product is forced by the feed screw through the cone and into a pressure pump of the gear type which increases the pressure from approximately one pound per square inch to slightly in excess of the desired operating pressure, which ordinarily is approximately eighty pounds per square inch. Preferably the teeth of the pressure pump gears will be of a relatively large pitch so that the interstices between the teeth will readily be filled with the viscous sausage material and in order to avoid, as much as possible, crushing the meat tissue. The product is discharged from the pressure pump into a receiving chamber or cylinder which contains a piston which is operated by any suitable means, such as pneumatic pressure, to maintain the contents of the cylinder at the constant operating pressure desired. The piston is equipped with limit switches so that the mechanism feeding meat to the cylinder will be actuated to maintain a working supply in the cylinder at all times, the switches being effective to initiate or stop the feed in accordance with the supply of product in the cylinder. Attached to the cylinder are the stuffing nozzles so that the ground meat can be discharged therefrom continuously at the desired operating pressures.

The preferred embodiment of the present invention is shown in the accompanying drawings which form a part of this specification and in which like reference characters in the several figures designate similar elements.

Figure 3:
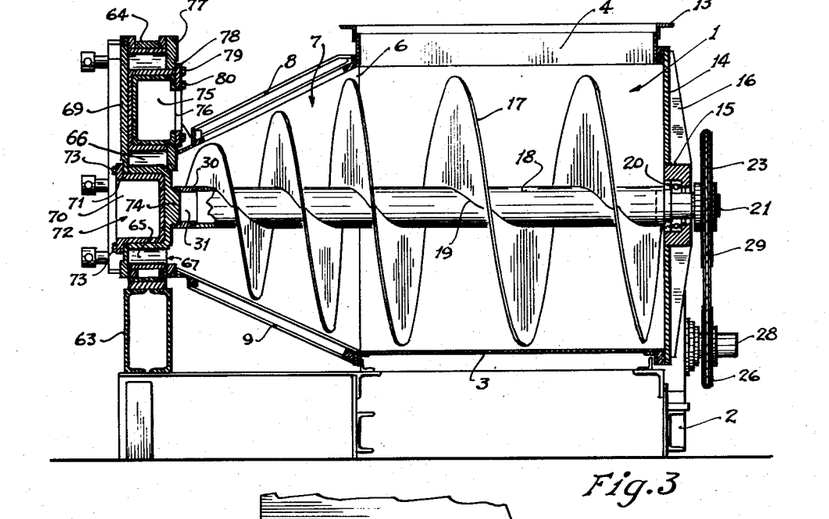
Figure 3 is a side view, partly in cross section, of the sausage stuffer shown in Figure 1 taken along the vertical plane shown by the line 3—3 of Figure 1 and A—A of Figure 6.
Figure 4:
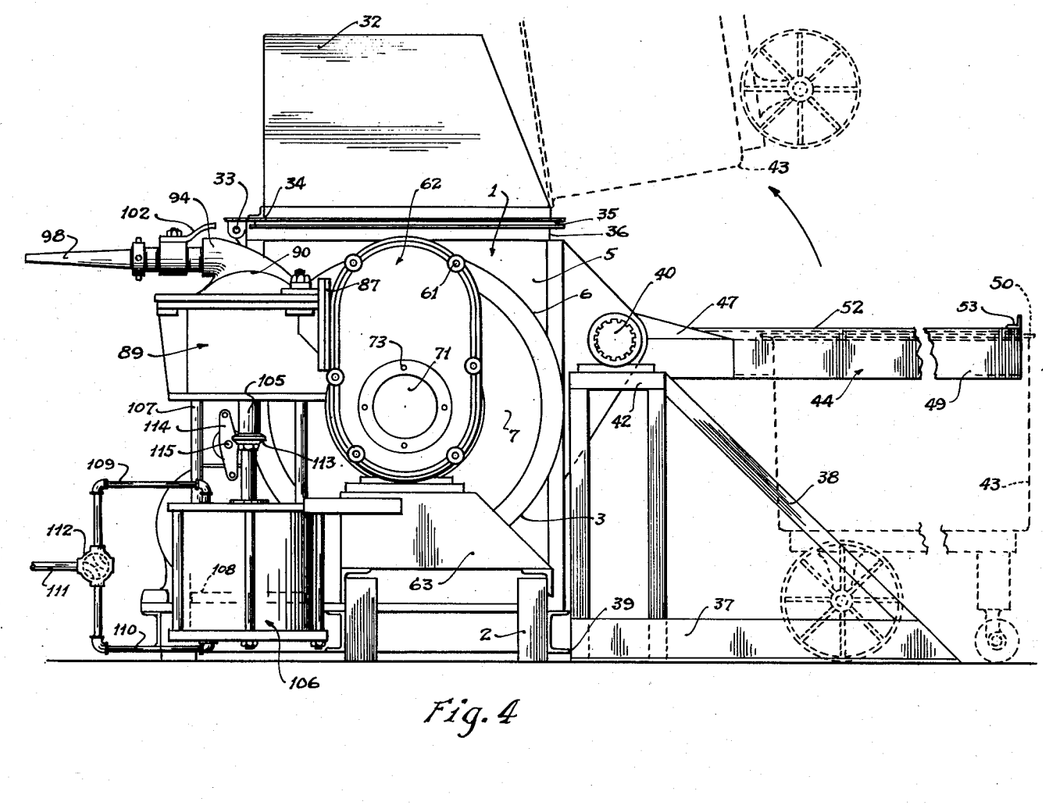
Figure 4 is a front end view of the stuffer shown in Figure 1.
Figure 5:
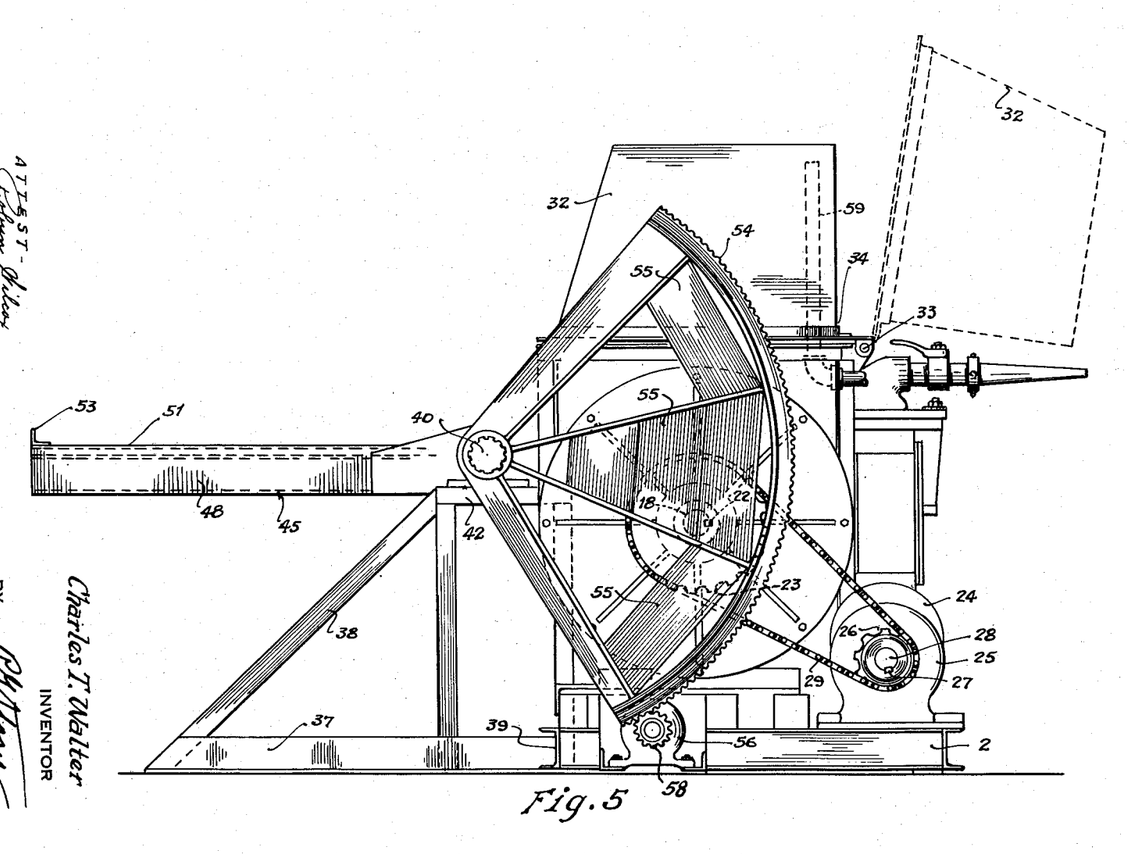
Figure 5 is a rear end view of the stuffer shown in Figure 1.
Figure 6:
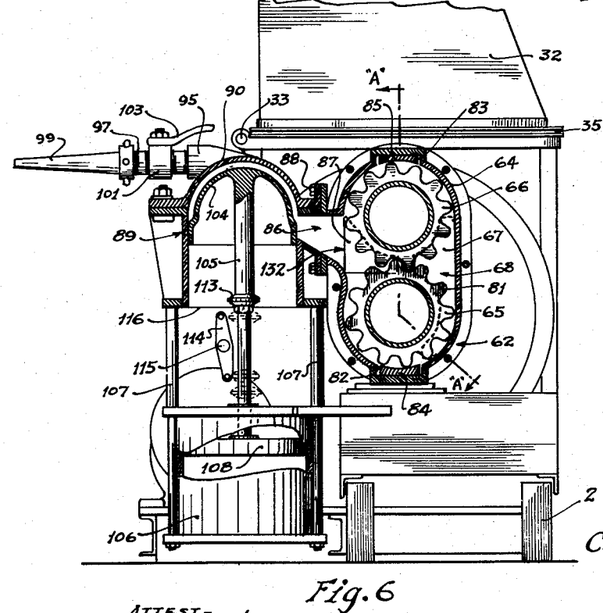
Figure 6 is a cross-section view of the gear pump and stuffing cylinders along the plane designated by the line 6—6 of Figure 1.

The present invention comprises a hopper 1 which is supported on a suitable base 2 and is constructed of sheet metal or other similar material with a large semi-circular bottom 3 as best shown in Figures 4, 5 and 6. The hopper 1 is preferably provided with a top opening 4 wide enough to permit the insertion of the front edge of the usual packing house meat truck as shown in broken lines in Figure 4. As shown in Figures 2, 3, 4 and 6, one surface of the hopper, such as 5, is provided with a circular opening 6 to which is affixed a truncated cone 7 coaxially aligned with the semi-circular bottom 3. The truncated cone is preferably provided with reinforcing ribs 8 and 9 in order to strengthen that portion of the apparatus against the pressures to which the cone is subjected. The cone 7 may be constructed from two or more sections, such as 10 and 11 attached to the reinforcing ribs 8 and 9 by wing nuts 12 and suitable bolts in order to facilitate the daily cleaning of the device.

As best shown in Figure 3, the top opening 4 is reinforced by suitable means, such as angle irons 13. The side 14 opposite the truncated cone is provided with bearing block 15 and with reinforcing ribs 16 to strengthen that side against the pressure exerted thereon.

Still referring to Figure 3, it will be seen that cooperating within the semicircular bottom 3 of the hopper 1 and the cone 7 is a long-pitch feed screw or worm 17, fitting rather loosely within the semi-circular bottom 3 of the hopper 1 and tapered to operate within the cone 7. The feed screw need not fit snugly within the hopper and cone as a loosely fitting screw is sufficient to push the material ahead with a slight pressure. The feed worm is welded, or otherwise rigidly affixed, to an axle 18, as at 19. One end of axle 18 is carried in suitable bearings 20 located in bearing block 15, and extends outside of the side wall 14, as at 21. Non-rotatably affixed to this outwardly extending portion 21 of the shaft, as by a key 22 (shown in Figure 5) is sprocket wheel 23. The machine is driven by any suitable source of power, such as motor 24 connected to speed reducer 25. A sprocket 26 is keyed, as by key 27, to the axle 28 of speed reducer 25. A chain 29 connects the sprocket 26 to sprocket 23 on shaft 18.

Referring now to Figure 3, it will be seen that the other end 30 of the shaft 18, which is adjacent to the extreme end of the cone 7, is provided with a square or other suitable driving cup 31 adapted to cooperate with the driving gear of the gear pump hereafter to be described.

A cover 32, as shown in Figures 1, 4, 5 or 6, is hinged as at 33 at one side 34 of the opening 4 of hopper 1 and is provided with a rubber or other suitable gasket, such as 35, to provide a vacuum seal to the apparatus. Adjacent the side 36, opposite the hinged side 34 of the hopper, preferably is located a meat truck dumper for up-ending the usual meat truck so that the material therein can readily be dumped into the hopper 1.

Figure 1:
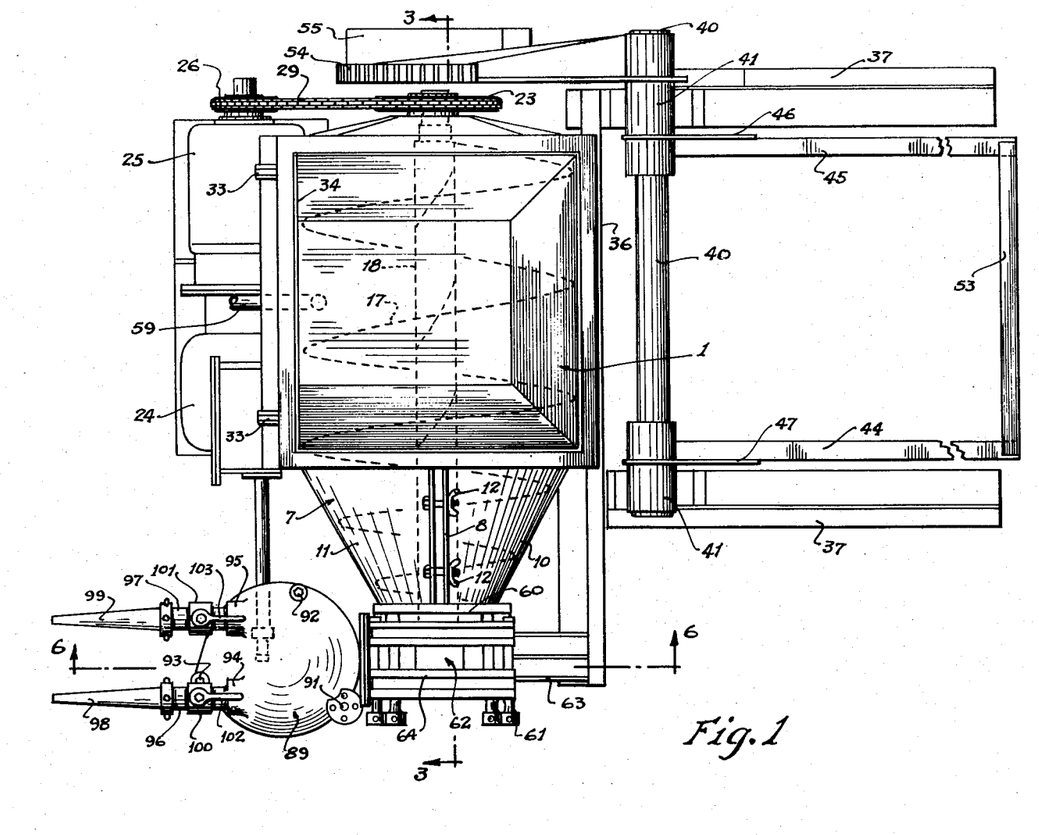
Figure 1 is a plan view showing the preferred embodiment of the present invention.

The truck dumper is best shown in Figures 1 and 5. Briefly, it comprises a base 37 properly strengthened, as by braces 38, and firmly attached to the base 2 of the hopper, as at 39. A shaft 40 parallel to side 36 of the hopper and adjacent thereto is journaled in bearings 41 affixed to cross pieces 42, supported by the base 37 at a height approximately equal to the height of the ordinary sausage truck 43 (Figure 4). Arms 44 and 45 are non-rotatably mounted on shaft 40, perpendicular to the shaft and wide enough apart to permit the meat truck 43 to fit between them.

Figure 2:
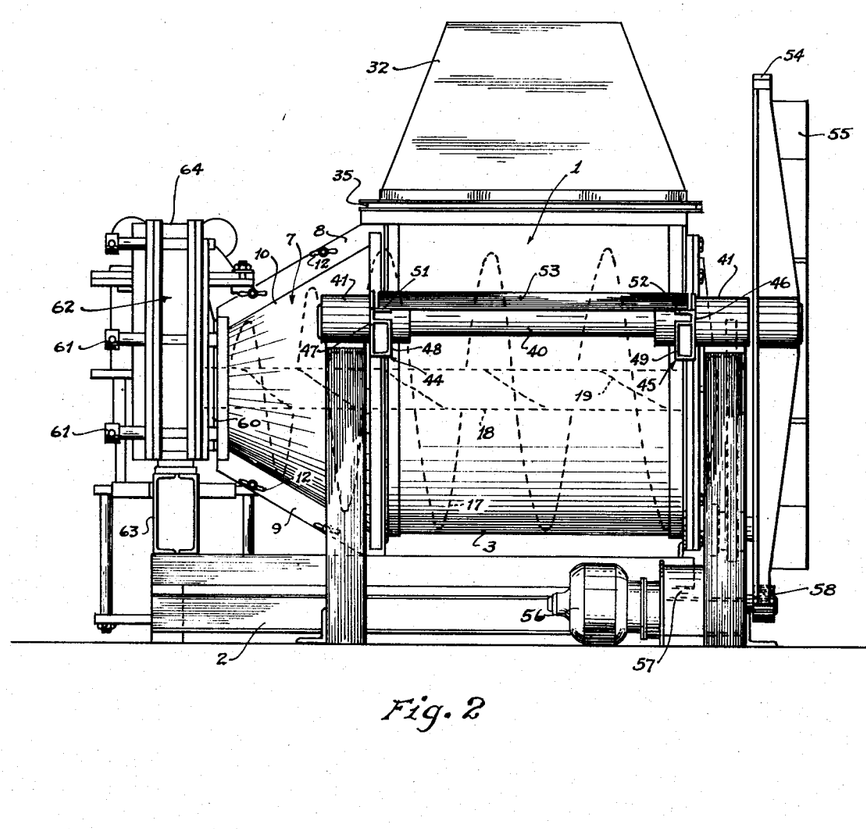
Figure 2 is a side view of the stuffer shown in Figure 1.

The details of the preferred construction of the arms are shown in Figure 2. I prefer that the arms 44 and 45 comprise steel plates 46 and 47, respectively. Channels 48 and 49 are respectively attached, as by welding or other suitable means, to the steel plates 46 and 47 and are substantially as long as the meat truck 43. The tops of the channels 48 and 49 are sufficiently high to permit the flanges 50 (Figure 4) to pass thereover when the truck 43 is run between the two arms. It should also be noted that the distance between the two channels is just sufficient to permit the body of the truck to fit snugly between them, as the truck 43 is lifted by its flanges 50 which fit over the channels 48 and 49. A short distance above the channels 48 and 49, and parallel thereto, are guides 51 and 52, respectively, also firmly attached to the arms 46 and 47, as by welding. The distance between the guides and channels should be sufficient to permit the flange 50 to pass between them. The guides are necessary to keep the truck from falling out of the arms when in a raised position. I also prefer to brace the free ends of the arms by a cross piece 53.

The operation of the truck dumper is most readily shown by referring to Figure 5. A large diameter gear segment 54 is non-rotatably mounted on one end of shaft 40. In view of the fact that the meat trucks are loaded with several hundred pounds of material, I prefer that the gear segment be provided with a plurality of counterweights 55. The motive power for the dumper is furnished by a small motor 56 mounted on the base 2, connected to a speed reducer 57 (Figure 2), to which is affixed a gear wheel 58 meshing with the teeth of the gear segment 54.

The operation of the dumper is readily apparent. The truck 43 is pushed between the arms 44 and 45, the motor 56 is started, which causes the rotation of the gear segment 54 and the arms 44 and 45. By this means the truck is up-ended over the opening 4 of the hopper 1.

The hopper 1 is also provided with an airline 59, Fig. 1 and Fig. 5, provided with a three-way valve, not shown. The valve connects with the outer atmosphere and also with a vacuum pump, not shown, so that air can be exhausted from the hopper or permitted to enter the hopper at the discretion of the operator. I prefer that the airline 59 terminate above the top of the hopper 1, as shown in Figure 5, so as to avoid danger of its becoming clogged by meat falling into it.

Referring now to Figures 1, 2 or 3, it will be seen that attached to the open end 60 of cone 7 by any suitable means, such as clamp screws 61, is a gear pump 62. The pump 62 is supported by any suitable means on base 2, as by channels 63. The gear pump 62 can be of any suitable construction, but I prefer one which can be driven from the axle 18 and which is readily taken apart and the gears easily removed for cleaning. For this purpose I prefer one such as shown in Figures 3 and 6, which is encased in a housing 64 surrounding the gears 65 and 66. The side of the block adjacent to the open end of the cone 7 is provided with a suitably large opening or inlet 67, best shown in Figure 7, whereby the ground meat may be pushed by the feed screw 17 into the intake or low pressure side 68 of the gear pump 62.

As shown in Figure 3, the wall 69 opposite this inlet 67 is provided with a relatively large circular opening 70 which is closed by the cover plate 71 formed in the shape of a large diameter hollow bearing 72. The cover plate 71 is affixed to the housing 64 by any suitable means, such as bolts 73. The driving gear 65 of the gear pump 62 is adapted to fit around the bearing 72 and is also provided with a driving lug 74 adapted to fit snugly into the driving cup 31 of axle 18. The driven gear 66 of the gear pump 62 is likewise adapted to rotate around a large hollow bearing 75 which may be removed through opening 76 in wall 77 of the housing 64 and is held in place by cover plate 78 affixed to the housing 64 by any suitable means, such as nuts 79. The bearing 75 may either be integral with the cover plate 78, as is the case of the bearing 72 for the driving gear, or may be in separate parts, as shown and described, and attached one to another by bolts 80. I prefer the use of hollow, large diameter bearings 72 and 75 and gears 65 and 66 of correspondingly large internal diameter in order to secure relatively light, easily handled parts of great strength.

Figure 7:
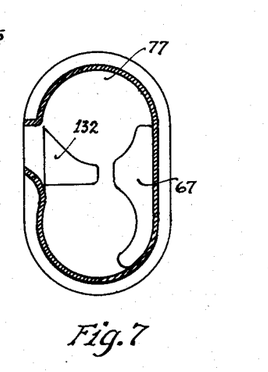
Figure 7 is a cross-section view of the gear pump identical with Figure 6, except that the gears have been removed.
Figure 8:
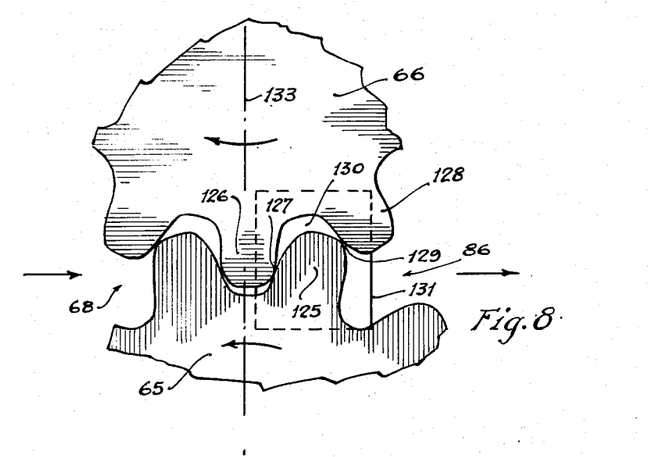
Figure 8 is an enlarged side view of the meshed gears shown in Figure 6.

Preferably the gears 65 and 66 have gear teeth 81 of very coarse pitch, as shown in Figures 6 and 8, to permit the interstices between the teeth to be readily filled with coarse and viscous material. Likewise, it is preferable to have the opening 67 from the cone 7 into the pressure pump 62 of large size, as shown in Figure 7, so that such coarse and viscous material may readily be pushed into the pressure pump by the relatively slight pressure of the feed screw.

As best shown in Figure 6, the housing 64 is provided with at least two recesses 82 and 83, one for each gear, in which can be inserted removable pressure sealing shoes 84 and 85, respectively, to prevent material from pushing from the high pressure, discharge side 86 back to the low pressure intake side 68 of the pump. The construction herein described permits the use of relatively lightweight gears with a coarse pitch which can readily be removed from the pump 62 by the loosening of a few bolts, such as 73 and 79, (Figure 3) and the removal of the large-diameter, hollow bearings 72 and 75. In this manner the gear pump can be readily taken apart and cleaned without excessive labor or time.

The outlet 87 of gear pump 62 is attached by any suitable means such as bolts 88 to the upper end of a meat or pressure equalization cylinder 89. The cyliner 89 serves as a reservoir to temporarily store the meat under a uniform stuffing pressure until it is permitted to pass from the cylinder to the containers being stuffed. The meat cylinder 89 is provided with a dome-shaped cover, such as 90. Preferably, the cover 90 is pivotally mounted as on bolt 91 (Figure 1) and held in place by other bolts such as 92 and 93. Within the upper portion of the dome cover 90 are threaded female openings 94 and 95, adapted to hold pipes 96 and 97 respectively, at the free ends of which are attached stuffing nozzles 98 and 99, respectively. The pipes 96 and 97 are also provided with valves 100 and 101, operated by hand levers 102 and 103 to control the flow of sausage meat into their respective nozzles.

As shown in Figure 6, pressure equalization cylinder 89 is provided with a tightly fitting dome-shaped piston 104, provided with a tail rod 105 which extends into air pressure cylinder 106 closed at both ends, coaxially aligned with and adjacent to the open end of meat cylinder 89, and attached thereto by any suitable means, as by bolts 107. Attached to the outer end of tail rod 105 and within air pressure cylinder 106 is piston 108. Referring briefly to Figure 4 it will be seen that both ends of air cylinder 106 are connected as by pipes 109 and 110 to a source of air pressure, as pipe 111, by means of a four-way valve 112 whereby air pressure may be exerted either way upon the piston 108. It is very desirable that airline 111 be provided with a pressure reducing valve, not shown, so that a constant pressure may be exerted upon piston 108 at all times. Preferably the air pressure will be approximately eighty pounds per square inch, as that is the usual pressure under which sausage is stuffed.

Intermediate the ends of tail rod 105 is a collar 113. In spaced relationship to said tail rod 105 is a lever 114 operating a mercury switch hereinafter described. The lever 114 is non-rotatably mounted on a shaft 115, with which it oscillates, and the shaft 115 is caused to oscillate as the collar 113 engages lever 114 as the former moves with the tail rod 105. The switch controlled by lever 114 controls the operation of the main driving motor, 24, so that when the lever is thrown to the "off" position by collar 113 the feed screw and pressure pump are stopped, and when the switch is thrown to the "on" position by movement of the collar 113, both are set in motion.

The size and location of the meat cylinder and the air cylinder are preferably such that the cylinder 89, cover 90, and piston 104, heretofore described, can be easily and readily cleaned. This is accomplished by properly spacing the meat cylinder 89 and the air pressure cylinder 106. Upon closing the valve 112 to permit the escape of compressed air from below the piston 108 in the cylinder 106 and introducing compressed air above that piston, it is forced to its lowest position. Pushing the air piston 108 to its extreme low position pulls the meat cylinder piston 104 below the open end 116 of the meat cylinder 89, which should be beyond the point where the collar 113 would move the switch to the "off" position. Thereupon the entire cylinder and piston may be flushed out with water. It will, therefore, be seen that the entire cylinder can be readily and easily cleaned by loosening bolts 92 and 93, rotating the cylinder head 90 about pivot bolt 91 and washing the piston 104, cylinder 89 and cylinder head 90 with water.

Figure 10:
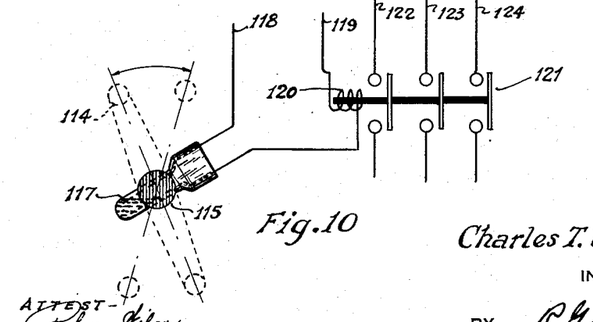
Figure 10 is a schematic diagram of the wiring and control switch for the stuffer shown in Figure 1.

The operation of the switch for the control of the operation of the device can best be understood by reference to Figure 10. A mercury switch 117 is firmly affixed to shaft 115 and pivots with the lever 114. The pivoting of this switch 117 opens and closes the 110 volt circuit represented by wires 118 and 119. A solenoid 120 is placed in this circuit and is obviously energized or deenergized as the collar 113 pivots the lever 114. The solenoid 120 opens and closes a normally open three pole relay 121 in the 220 volt circuit designated by wires 122, 123 and 124 running to the motor 24. When the material in the meat cylinder is nearly depleted the collar 113 in its upward movement pushes the lever 114, which in turn pivots the mercury switch to the "on" position, thereby energizing the solenoid to close the relay 121 and permit current to flow to the motor 24. If meat is not removed from the cylinder as fast as it enters, the piston is pushed down, so that the collar 113 pivots the lever 114 to its other position, the mercury switch is swung to the "off" position, the solenoid is deenergized, the relay returns to its normally open position, and the motor is stopped.

Figure 9:
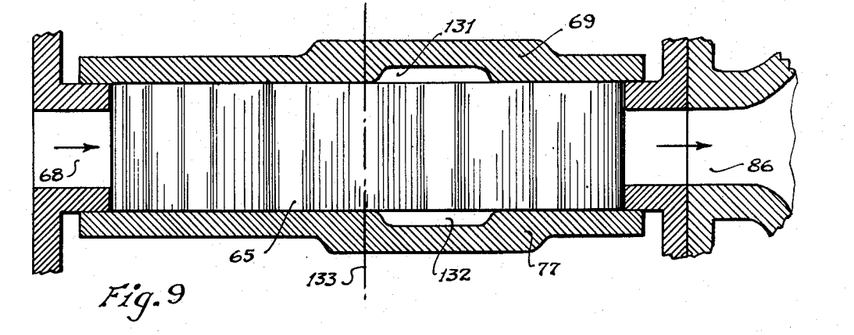
Figure 9 is a plan view in cross-section of the gear pump and housing with the upper gear removed.

A preferred form of gear pump is shown in Figures 8 and 9. The usual gear pressure pump, which is designed for fluid materials, uses gears with small teeth. These are not satisfactory for a viscous material such as sausage meat as the material does not readily enter in interstices between the gear teeth. It is therefore necessary to use gears with teeth of coarse pitch, which, because it is desirable to use gears that are relatively tight fitting, raises a question of pump design. It will readily be seen in Figure 8 that a quantity of product is ordinarily trapped between the teeth as they intermesh. As seen in this figure, the leading flank of tooth 125 of gear 65 is contacting tooth 126 of gear 66, as at 127, and the trailing flank of tooth 125 is contacting tooth 128 of gear 66, as at 129. As these two gears operate with their faces in close working relationship to the machined side walls 69 and 77 of the pump housing, the volume of material in the space 130, defined by the lines of contact 127 and 129, is effectively trapped. When this material is a relatively non-compressible substance, the efficient operation of the gear pump is effectively reduced. To avoid this difficulty, pressure relief ports 131 and 132 may be provided in the side walls 69 and 77, respectively, of the pump. By means of such relief ports material that is trapped in the space 130 can find its way into the high pressure or discharge side 86 of the pump. It is self-evident that these ports must be so located as to not break the seal between the high pressure side 86 and low pressure side 68 of the pump, and on the other hand must be of a size and location as to readily permit the material caught in space 130 to readily flow into one or the other sides of the pump, preferably the high pressure side 86, when the volume of such space 130 is being decreased by the rotation of the gears.

As shown in Figure 8, the relief ports 131 and 132 should be somewhat larger than the space 130 defined by the meshing teeth. Necessarily, the ports should not quite reach the line 133 connecting the centers of the two gears, for if it did material could flow into both sides and the seal between them would be broken. Preferably the ports will be located on the high pressure side 86 of the pump in order to avoid returning product to the intake side 68, although location on the other side would permit more efficient operation than in the past. Necessarily, also, the ports must extend some distance into the side in which located, so as to permit a ready flow of material from the port into that side. Preferably the ports should extend in the dimension parallel to the line 133 between the centers of the two gears, somewhat beyond the root diameters of each gear, and in the other direction should extend from near said line of centers to well within one side of the pump, but should not cross such line of centers. One design of a port is shown in Figure 8 and another in Figure 7, which shows the port 132 in wall 77.

In the operation of the continuous sausage stuffer herein described, when the valve in vacuum line 59 is opened so that air can be admitted into the hopper, the hinged cover 32 can be raised above the hopper 1 (as shown by the broken line in Figure 5). The meat truck 43 is pushed between the arms of the truck dumper, the motor 56 is started, and the truck up-ended over hopper 1. The material in the truck is then easily removed and dumped into the hopper. The lid 32 is then closed and the valve on the vacuum line 59 changed by the operator so that the air is drawn from the hopper through vacuum line 59. It is desirable to remove air from sausage meat as shortly before stuffing as possible in order to firmly pack the meat into its containers and thereby avoid air pockets in the stuffed product.

If compressed air is admitted into air pressure cylinder 106 below the piston (normal operating condition) the piston is pushed upwardly and the collar 113 trips the switch 117 operated by lever 114, the main driving motor 24 is started, and by means of the gearing shown the feed worm 17 and gear pressure pump 62 are operated. The feed worm 17 pushes the ground meat into the intake opening 67 of gear pump 62 under a small operating pressure, such as one pound per square inch. The rotation of the gears 65 and 66 of the gear pump 62 carries the ground meat in the spaces between the teeth to the opposite side of the gear pump, where it is squeezed therefrom by the meshing of the teeth of the two gears. The continued operation of the pump soon builds up considerable pressure, efficiently operating at pressures of over eighty pounds per square inch. The material is forced from the gear pump through outlet 87 into the upper end of cylinder 89, at pressures slightly in excess of those of the air pressure in cylinder 106. This pushes the piston 104 in meat cylinder 89 down until the collar 113 throws the lever 114 to the "off" position, which stops the motor and rotation of the feed worm 17 and the gears 65 and 66 of the gear pump 62. However, the constant air pressure in air pressure cylinder 106 tends to push the piston 104 in meat cylinder 89 up to the head 90 thereof so that meat can be effectively taken therefrom and sausage continuously stuffed by the operator through nozzles 98 and 99, the flow of meat being controlled by the usual operating valves 100 and 101.

After the worm and pump have been stopped by control switch 117, material can be taken from the meat cylinder at any desired rate until piston 104 has moved to a position where collar 113 moves control switch lever 114 to the "on" position. At this point the motor 24 is started and material will again start to flow into cylinder 89 and will continue to flow until the mechanism is again stopped by the control switch. It is obvious that should the material be taken from the meat cylinder 89 at the same rate as it is being supplied by the pump 62, the pump would operate continuously.

Manifestly, many modifications and variations of the invention hereinbefore set forth may be made by persons skilled in the art and it is intended that such modifications be included within the scope of this invention as defined in the following claims.

I claim:

1. A method for the continuous stuffing of viscous material into containers, which comprises subjecting the material to a pressure substantially below that required for stuffing, raising the pressure thereon to at least stuffing pressure, then delivering said material to a reservoir maintained constantly at a stuffing pressure, and then stuffing the material from said reservoir into the container while maintaining the pressure substantially constant.

2. A method for the continuous extruding of viscous material under substantial and constant pressure, which comprises subjecting a stream of the material to a relatively low pressure, raising the pressure on said stream in excess of the extruding pressure, then delivering said material to a reservoir, regulating the pressure in said reservoir to that required for extruding said material, and then extruding the same.

3. A method for the continuous stuffing of sausage meat into containers, which comprises subjecting the meat in a first stage to a relatively low pressure, raising the pressure on the meat in a second stage to a relatively high pressure, then delivering said material to a reservoir, regulating the pressure in said reservoir to stuffing pressure, and then stuffing the meat into the container.

4. A method for the continuous stuffing of sausage meat and like material into containers, which comprises forcing the sausage meat by at least one stage of pumping into a pressure equalizing zone, charging the sausage meat from said zone into the containers, and regulating the amount of sausage meat charged to said pressure equalizing zone by the volume of sausage meat therein.

5. A method for the continuous stuffing of ground meat into containers, which comprises maintaining a body of the ground meat under a substantially constant pressure, charging said ground meat into containers from said body, intermittently feeding fresh ground meat into said body, and automatically controlling said intermittent feeding in response to the volume of ground meat in said body.

6. An apparatus for stuffing viscous material into containers comprising means for subjecting such material to a relatively low pressure, means for increasing the pressure thereon to a predetermined operating pressure, means to receive said material under pressure and including means for maintaining said material under a substantially uniform operating pressure, and means connected to said receiving means whereby material may be simultaneously delivered to and withdrawn from said receiving means.

7. An apparatus for the continuous extruding of viscous material under substantial and constant pressure, which comprises means for subjecting a stream of the material to a relatively low pressure, means for increasing the pressure on said stream to a relatively high pressure, said last named means including means for adjusting and uniformly maintaining the pressure on the said material and for extruding said material.

8. In a sausage stuffer means for subjecting sausage material to a relatively low pressure, said means comprising a hopper with a rotatable feed screw therein, means for increasing the pressure to a predetermined operating pressure, means to receive said material under pressure and including reservoir means for maintaining said material under a substantially uniform operating pressure, and outlet means connected to said reservoir to permit the material to be delivered to containers.

9. In a sausage stuffer comprising means for subjecting sausage material to a relatively low pressure, pumping means for thereafter increasing the pressure on said material to at least a predetermined operating pressure, means to receive said material under pressure and including means for maintaining said material under a substantially uniform operating pressure, and means connected to said receiving means whereby material may be simultaneously delivered to and withdrawn from said receiving means.

10. In a sausage stuffer comprising means for subjecting sausage material to a relatively low pressure, means for increasing the pressure on the material to a predetermined operating pressure, means to receive said material under pressure and including means for maintaining said material under a substantially uniform operating pressure, said means for maintaining said operating pressure having a cylinder, a movable piston therein, and means for exerting pressure upon said piston.

11. In a device for the continuous extrusion of viscous material under a predetermined pressure, the combination of a hopper, a rotatable feed screw within said hopper, a pressure pump connected to said hopper at the discharge end of said feed screw, a receiving chamber connected to the discharge side of said pressure pump and provided with means for maintaining a predetermined pressure upon the product therein, means for extruding said material connected with said chamber, and means for driving said feed screw and said pressure pump.

12. A machine for the continuous extrusion of viscous material under a predetermined pressure comprising a hopper, a feed screw operating within said hopper and tending to force the material contained therein toward one wall thereof, a pressure pump, the intake for which is connected to the last mentioned wall of said hopper, a receiving chamber connected to the discharge side of said pressure pump, which chamber contains a movable piston, means for exerting a predetermined pressure upon said piston, and an extrusion device attached to said chamber.

13. A machine for the continuous stuffing of sausage and like products comprising a hopper, one surface of which terminates in a truncated cone, a large, long-pitch feed screw operating within said hopper and cone and tending to force the product contained therein toward the apex of said cone, a pressure pump of the gear type, the intake for said pressure pump being connected to the truncated surface of said cone, a receiving chamber connected to the discharge side of said pressure pump, said chamber having a piston movable therein, means for exerting a predetermined pressure upon said piston, and means for operating said feed screw and pressure pump in response to movement of said piston.

14. A machine for the continuous stuffing of sausage and like products comprising a hopper with a semi-circular bottom, one side of said hopper comprising a truncated cone coaxially extended from said semi-circular bottom, a tightly fitting cover on said hopper, means for exhausting the air from said hopper, a hoisting means for loading product into said hopper, a large, tapered, long-pitch feed screw in said hopper and cone in cooperative relationship to said semi-circular bottom and to said cone to force the product toward the apex of the cone, means for rotating said feed screw, a gear pressure pump provided with teeth of coarse pitch removably affixed to the truncated surface of said cone, a relatively large opening between the truncated surface of said cone and said pressure pump, means whereby the driving gear of said pump is attached to and driven by the axle of the said feed screw, a cylinder connected to the outlet of said gear pump, said cylinder being provided with a removable, dome-shaped cover provided with stuffing nozzles, a piston within said cylinder, means for exerting a predetermined pressure against said piston, and means for operating said screw and gear pump in response to the movement of said piston.

15. In an apparatus for stuffing comminuted meat into containers, the combination of a reservoir having inlet and outlet openings and including means for continuously maintaining a volume of the comminuted meat under a substantially constant stuffing pressure whereby it may be forced through said outlet into a suitable container, said volume being continuously variable by increasing and decreasing amounts as meat is fed into and discharged from the reservoir, means operable for feeding said meat to said reservoir at a pressure so high as to overcome the resistance offered against the introduction of new material into the zone produced by said stuffing pressure whereby to increase the volume of meat in the reservoir while meat is being discharged from the outlet and after the volume has decreased to a predetermined quantity, means responsive to the quantity of meat in said reservoir for automatically initiating and discontinuing operation of said feeding means, and additional means in said outlet which are operable at all times and even while the comminuted meat is being fed to the reservoir to permit the volume of said meat in said reservoir to be decreased.

16. A method that may be adapted to a substantially continuous stuffing of containers with a viscous material comprising maintaining a volume of viscous material in a zone under a substantially constant stuffing pressure from where the material is permitted to intermittently escape into a container, said volume being variable by increasing and decreasing amounts as the material is fed into and away from the zone, intermittently feeding material to said zone at a higher than stuffing pressure to increase the volume, said feeding step being performed while continuously maintaining the pressure on the material in said zone, automatically controlling said feeding step while meat is being discharged to initiate feeding of viscous material when the volume has decreased to a predetermined quantity and to discontinue feeding when the volume has increased to a predetermined quantity, and intermittently causing a portion of the material in the zone to escape into containers thereby decreasing the volume of the material in the zone.

CHARLES T. WALTER.